Patented July 7, 1925.

1,544,924

UNITED STATES PATENT OFFICE.

PAUL NAWIASKY AND WALTER KRANNICH, OF LUDWIGSHAFEN-ON-THE-RHINE, GERMANY, ASSIGNORS TO BADISCHE ANILIN- & SODA-FABRIK, OF LUDWIGSHAFEN-ON-THE-RHINE, GERMANY, A CORPORATION OF GERMANY.

VAT COLORING MATTERS PRODUCED BY HALOGENATING N-DIHYDRO-1.2.1'2'-ANTHRAQUINONE AZIN.

No Drawing.   Application filed October 23, 1923.   Serial No. 670,244.

*To all whom it may concern:*

Be it known that we, PAUL NAWIASKY and WALTER KRANNICH, citizens of Austria and the German Empire, respectively, residing at Ludwigshafen-on-the-Rhine, Germany, have invented new and useful Improvements in Vat Coloring Matters Produced by Halogenating N-Dihydro-1.2.1'2'-Anthraquinone Azin, of which the following is a specification.

The invention relates to new vat coloring matters which excel by valuable tinctorial properties. As is known, N-dihydro-1.2.1'.2'-anthraquinone azin, or indanthrene blue,

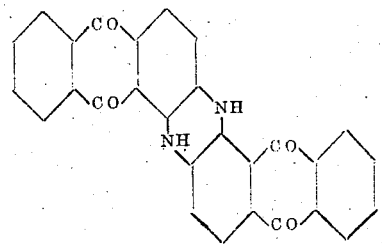

while extremely fast to light and other influences, is not so fast to chlorin. Halogen derivatives of said dyestuff have an improved or even very good fastness to chlorin, but in general, the faster they are to chlorin the more they display a new disadvantage in being sensitive to hard calcareous water in dyeing as the dyeings are considerably weakened thereby. We have now found a new class of halogen derivatives of N-dihydro-1.2.1'.2'-anthraquinone azin which contains chlorin as well as bromin and which are both fast to chlorin and practically insensitive to calcareous water.

These new vat coloring matters can be obtained by chlorinating and brominating, in this or the inverse succession, N-dihydro-1.2.1'.2'-anthraquinone azin. In case the dyestuff is produced by first brominating and then chlorinating the original dyestuff, the operations are carried out with the latter dissolved in concentrated sulfuric acid, while the inverse operations viz first chlorinating and then brominating may be carried out in any usual manner, though it is of particular advantage to use a sulfuric acid solution for the step of brominating and to effect chlorinating in a dry condition or also in concentrated sulfuric acid solution. Halogen transporters may be used in all instances.

The following examples serve to further illustrate the invention and the manner of carrying it into effect, but the invention is not limited to these examples. The parts are by weight.

*Example 1.*

44 parts of indanthrene blue RS (N-dihydro-1.2.1'.2'-anthraquinone azin) are dissolved in 500 parts of sulfuric acid of 66 degrees Baumé, a solution of 1.5 parts of sodium nitrite in 10 parts of sulfuric acid of 66 degrees Baumé is then added and a current of chlorin slowly passed through for several hours, at a temperature of 60 degrees centigrade. Then after adding a little more sodium nitrite, dissolved in concentrated sulfuric acid, 16 parts of bromin are gradually introduced and the mixture is kept at 60 degrees centigrade for 10 additional hours. The mixture is then poured into water, the precipitate filtered off, washed until neutral and made into a paste.

*Example 2.*

A dry mixture of 100 parts of indanthrene blue RS, 15 parts of anhydrous sodium acetate and 5 parts of ferric chlorid are agitated with 40 parts of chlorin at a temperature of 70 degrees centigrade until all of the chlorin has been consumed, which requires about 6 or 7 hours. The product is dissolved in ten times its weight of sulfuric acid monohydrate and 43 parts of bromin are slowly added, whereupon the solution is heated to 60 degrees centigrade and kept at this temperature for an hour. The mixture is poured into water, the dyestuff which is precipitated thereby filtered off, washed and made into a paste. It is very similar in its properties to the dyestuff obtained according to the foregoing example.

*Example 3.*

88.4 parts of indanthrene blue RS are dissolved in 1000 parts of sulfuric acid of 66 degrees Baumé. After adding a solution of 6 parts of sodium nitrite in 40 parts of sulfuric acid of the same strength, 16 parts of bromine are allowed to run in slowly, the solution is then gradually heated to 60 degrees centigrade and kept at this temperature for a few hours. An additional small quantity of sodium nitrite, dissolved in concentrated sulfuric acid, is then added and a slow current of chlorin passed through the solution, while at the same temperature for 6 or 7 hours. The mixture is then worked up as described in the foregoing examples.

We claim:

1. As a new article of manufacture, halogenated N-dihydro-1.2.1'.2'-anthraquinone azin which contains both combined chlorin and bromin and which is a blue vat coloring matter, fast to chlorin and practically insensitive to calcareous water in dyeing from the vat.

2. The process of manufacturing halogenated vat coloring matters which consists in first chlorinating N-dihydro-1.2.1'.2'-anthraquinone azin in a dry state and subsequently brominating the chloro-derivative in concentrated sulfuric acid solution.

In testimony whereof we have hereunto set our hands.

PAUL NAWIASKY.
WALTER KRANNICH.